United States Patent [19]

Matteson

[11] 4,367,493
[45] Jan. 4, 1983

[54] RASTER SCANNER APPARATUS AND METHOD

[75] Inventor: Ronald G. Matteson, Walworth, N.Y.

[73] Assignee: Xerox Corporation, Stamford, Conn.

[21] Appl. No.: 250,457

[22] Filed: Apr. 2, 1981

[51] Int. Cl.³ .................................................. H04N 1/10
[52] U.S. Cl. .................................... 358/293; 358/288; 358/260; 358/213
[58] Field of Search ............... 358/293, 294, 285, 288, 358/213, 250, 267, 268, 260

[56] References Cited

U.S. PATENT DOCUMENTS

| | | | |
|---|---|---|---|
| 3,422,923 | 10/1969 | Montevecchio | 358/260 |
| 3,506,785 | 4/1970 | Harris, Jr. | 358/264 |
| 3,622,695 | 11/1971 | Rugaber | 358/260 |
| 4,142,207 | 2/1979 | McCormack et al. | 358/113 |
| 4,153,915 | 5/1979 | McKechmie | 358/213 |
| 4,160,279 | 7/1979 | Fuwa | 358/288 |
| 4,188,642 | 2/1980 | Morishita et al. | 358/213 |

Primary Examiner—Robert L. Griffin
Assistant Examiner—Edward L. Coles
Attorney, Agent, or Firm—Frederick E. McMullen

[57] ABSTRACT

A raster scanner with linear scanning array, a scanning slit permitting the array to view a document image one line at a time, and document transport for transporting documents past the scanning slit. To accommodate the disparity between scanning rates and user data rates, a relatively small buffer stores lines of pixels output by the array pending user demand. Intermittent operation of the scanner in response to buffer pixel demands is effected through starting and stopping of the document transport. A control is provided to prevent uneven spacing of scan lines resulting from scanning stopped documents or documents in the process of being accelerated or decelerated to and from scanning speed by the document transport.

9 Claims, 4 Drawing Figures

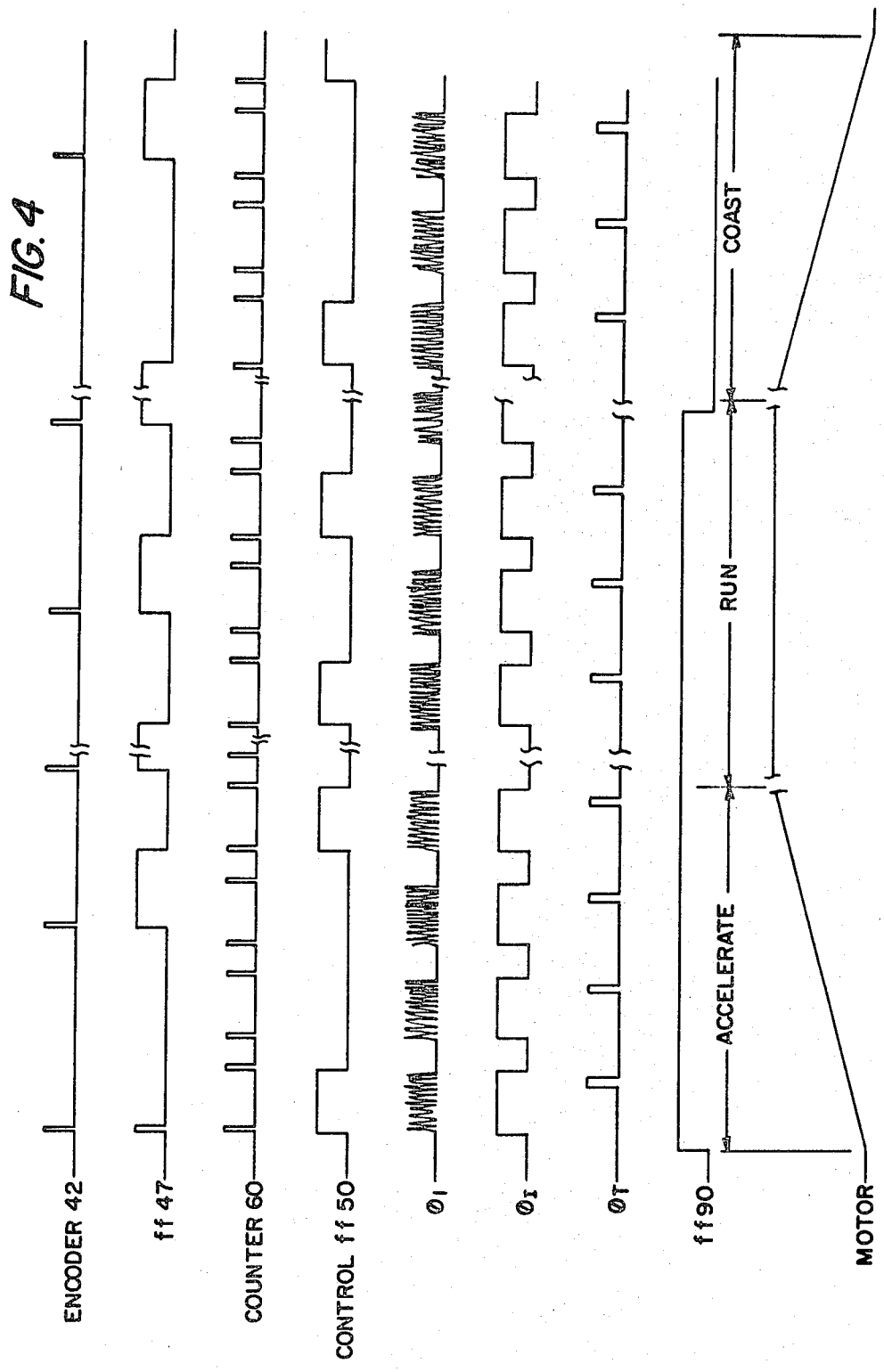

RASTER SCANNER APPARATUS AND METHOD

BACKGROUND OF THE INVENTION

The invention relates to a raster scanner and scanning method, and more particularly to a raster scanning and scanning method wherein the scan line output rate is tailored to the document transport speed to avoid uneven spacing of scan lines.

Raster scanners incorporate a means such as a linear array of photo-optical elements for scanning a document image scan line by scan line. Typically, a platen-like surface is provided on which the document to be scanned is supported, a scanning slit being provided in the platen through which the arrary scans the document. A document transport is provided for moving the document past the scanning slit during the scanning operation to present fresh image areas to the array and preclude scanning of previously scanned areas of the document.

Due to the intrinsic nature of arrays, the pixel output is grouped by scan lines, and scan lines are captured at a rate designed for optimum collection of image information. Unfortunately, the scan line rate of the array seldom corresponds with the demands and needs of the output device or user which the scanner serves, and to accommodate this disparity, a storage buffer is interposed between the array output and the user to store, pending demand, some portion or all of the scan lines produced by the array. Thus, the user can draw scan lines on demand from the buffer at a rate compatible with the user's needs and, as the supply of scan lines in the buffer falls, the scanner is actuated to replenish the buffer. In this type of arrangement, it will be understood that in order to permit the scanner to replenish the buffer in the face of a scan line drawout by the user, the scan line output rate of the scanner must be greater than the rate at which the user draws scan lines from the buffer.

In scanners of the aforementioned type, where the array scans a moving document through a relatively narrow scanning slit, stopping and starting of the document transport in response to demand for scan lines by the buffer is required. Otherwise the buffer may be over-filled if demand for data by the output device is reduced, resulting in the loss of portion of the document image. To avoid this, more than one scan of the document would be required if capture of the entire image is to be assured. However, periodic stopping of the document transport can also lead to duplicate or overscanning problems which come about from the need to maintain common arrays operating continuously. This can result in duplicate scanning of the same line while the document transport is stopped and the document is stationary. And during periods of acceleration and deceleration of the document transport, when the effective speed of the document past the scanning slit is less than the speed required for optimum and undistorted scanning scan lines will be spaced too close together and overlap.

SUMMARY OF THE INVENTION

This invention relates to a raster scanner, comprising in combination: a platen for supporting documents to be scanned; a document scanning slit in the platen; document transport means for transporting documents to be scanned along the platen and across the scanning slit at a controlled scanning speed; at least one array of scanning elements for scanning documents line by line through the scanning slit, the array producing image pixel lines representative of the document image scanned; clock means for operating the array at a preset scanning rate; buffer means for receiving pixel lines output by the array; means for starting and stopping the document transport means in response to demand for pixel lines by the buffer means; and control means for discarding redundant pixel lines output by the array when the document transport means is stopped or accelerating or decelerating to or from the controlled scanning speed to thereby accommodate continued operation of the array at the preset scanning rate while the document transport means is stopped, or accelerating or decelerating while avoiding output of redundant pixel lines to the buffer means.

The invention further relates to a scanning method for supplying pixel lines on demand to a buffer while accommodating any disparity between the scan rate of a scanning array which scans documents one line at a time through a scan slit and the rate at which documents are moved across the scan slit, comprising the steps of: scanning the array continuously to produce pixel lines at a predetermined rate irrespective of document movement; monitoring the supply of pixel lines in the buffer; moving the document to be scanned across the scan slit in response to a preset low supply of pixel lines in the buffer and stopping the document when the supply of pixel lines in the buffer reaches a preset high; and outputting one pixel line to the buffer for each document line scanned while discarding any redundant pixel lines resulting from repeated scanning of the same document line by the array when the rate at which documents are moved across the scan slit is less than the array scan rate.

BRIEF DESCRIPTION OF THE DRAWINGS

FIG. is a block diagram showing the raster scanner of the present invention combined with output buffer and user;

FIG. 4 is a timing chart illustrating the operating sequences of certain components of the raster scanner shown in FIG. 1.

DESCRIPTION OF THE PREFERRED EMBODIMENT

Figure 1:
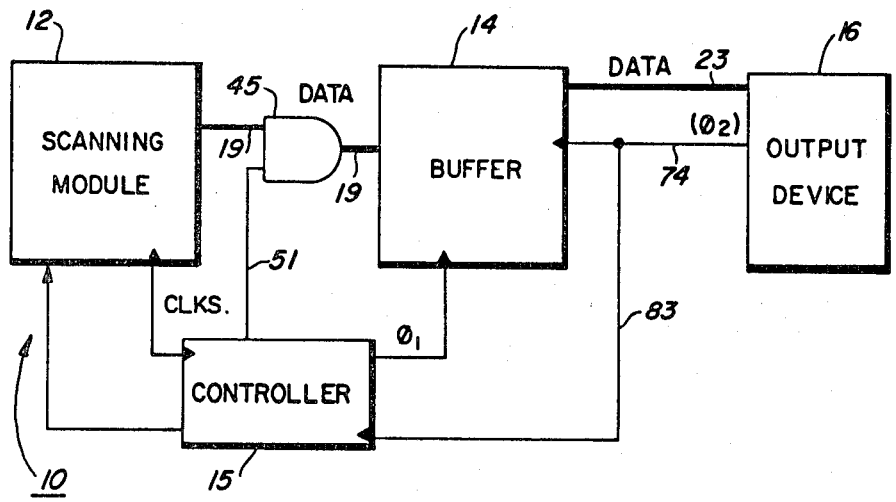

Referring particularly to FIG. 1 of the drawings, there is shown the raster scanner 10 of the present invention. Scanner 10 comprises a scanning module or image input terminal 12, a line storage buffer 14 of relatively small capacity (i.e. 10 lines), and a controller 15. As will appear, scanning module 12 scans document originals 18 (shown in FIG. 2) line by line to produce image signals or pixels representative of the document images scanned. The pixel output of scanning module 12 is fed through data bus 19 and pixel control gate 45 to buffer 14 where the lines of pixels are temporarily held pending demand by the output device or user 16 to which scanner 10 is coupled. Controller 15 controls operation of scanning module 12 and the output of pixel lines to buffer 14 in accordance with the demands of buffer 14, as will appear.

Output device 16 may comprise any suitable user such as a xerographic based raster output scanner, memory, data communication channel, etc. Pixel lines are output by buffer 14 to output device 16 through data bus 23.

Figure 2:
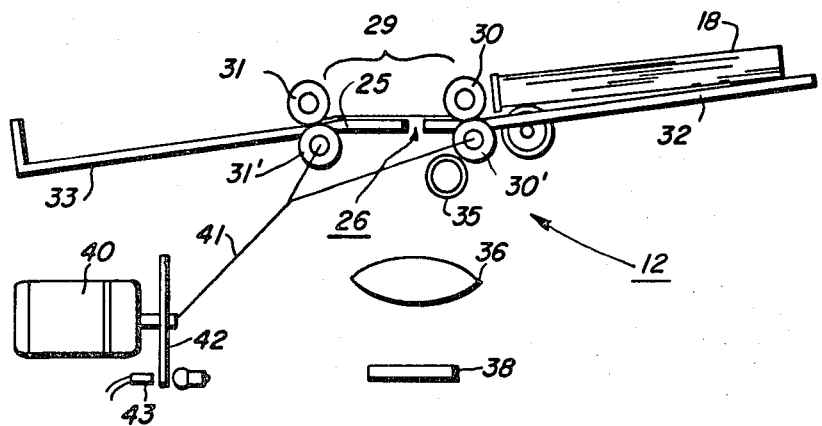
FIG. 2 is a side view showing details of the document transport and scanning mechanism of the rater scanner shown in FIG. 1.

Referring to FIG. 2, in the exemplary arrangement shown, scanning module 12 includes a suitable document support or platen 25 having a slit-like scanning aperture 26 therethrough. The documents 18 to be scanned are transported across platen 25 and scanning slit 26 by means of a suitable document transport 29 exemplified herein by pinch roll pairs 30, 31 documents 18 being advanced forward one by one into the nip of roll pair 30, 31 by suitable means from document supply tray 32. Following scanning, the documents may be conveniently collected in document catch tray 33.

To illuminate the scanning slit area and the document portion opposite slit 26, a suitable lamp 35 is provided. Image rays reflected from the surface portion of the document opposite scanning slit 26 are focused by lens 36 onto one or more photosensing array 38. Arrays 38 typically comprise a linear array of opto-electronic photosensitive elements such as photodiodes (not shown). One suitable array is Model CCD 121H manufactured by Fairchild Corporation. As will be understood, the number of photosensitive elements in an array determines the scanning resolution and to enhance resolution, plural arrays may be optically, electronically, or physically joined to form a composite array of increased resolution.

Rolls 30', 31' of pinch roll pairs 30, 31 are driven by transport drive motor 40 through motor shaft 41. Motor 40 preferably comprises a servo controlled D.C. torque motor. Other motor types such as a stepper motor may however, be envisioned. A suitable rotary shaft encoder 42 is provided on motor shaft 41, detector 43 of encoder 42 serving to generate a preset number of pulses (i.e. 1,000) for each revolution of shaft 41.

The operating rates of scanner 10 and output device 16 are normally different. Referring particularly to FIG. 4, it can be seen that the pixel output of an array of the type contemplated herein is in blocks of one scan line, there being an integration period ($\phi_I$) during which the image is viewed by the array photosensitive elements, followed by transfer ($\phi_T$) to an on-board shift register or registers. During the next integration period, the previously gathered image pixels are clocked out of the array on-board shift register(s) to data bus 19 by the pixel clock pulses $\phi_1$ while the next line is being scanned. The foregoing process is repeated for each pixel line. The scan rate of array 38, which is greater than the maximum feed rate of document transport 29, is normally determined by the inherent characteristics of the array itself in correlation with the operating characteristics of the ancillary components, i.e. lamp 35.

In contrast, the output device 16 normally operates at a different rate. Output device 16 may for example, demand pixel lines at a slower clock rate, or intermittently at different and unequal time intervals, etc.. Buffer 14 serves to temporarily store a small number of lines to meet the immediate needs of output device 16 without delay. As a result, scanning module 12 is stopped and started in response to the needs of buffer 14.

However, array 38 scans a relatively minute portion of the document 18 moving across scan slit 26, the document image area viewed by array 38 (i.e. a line) being dependent upon the scanner optics and array operating parameters. Starting and stopping of scanning module 12 to accommodate the demands of buffer 14 upsets the aforementioned scanning rate and may result is distorted and inaccurate reproductions of the document image.

As will be understood, when scanning module 12 is stopped, the document 18 is at a standstill on platen 25 and array 38 is fixed on a single document line. On resumption of scanning, inertia of the scanner components prevents document 18 from reaching scanning speed instantaneously. During this period of acceleration (shown in FIG. 4), the rate of movement of document 18 across scan slit 26 is less than the rate at which array 38 is designed to scan. Similarly, on stopping of scanning module 12, inertia precludes document 18 from being stopped instantaneously and as a result, document 18 continues to move across scan slit 26 at a decreasing rate until the document comes to a full stop. Should scanning be terminated during these periods of acceleration and deceleration, portions of the document image may be lost. If, however, array 38 is operated during these periods, redundant or duplicate scan of the document image can occur.

As will appear, controller 15 serves to integrate operation of scanning module 12 with the demands of buffer 14 while at the same time preventing distortion, duplication, and loss of image output caused by repeated starting and stopping of scanning module 12.

Figure 3:
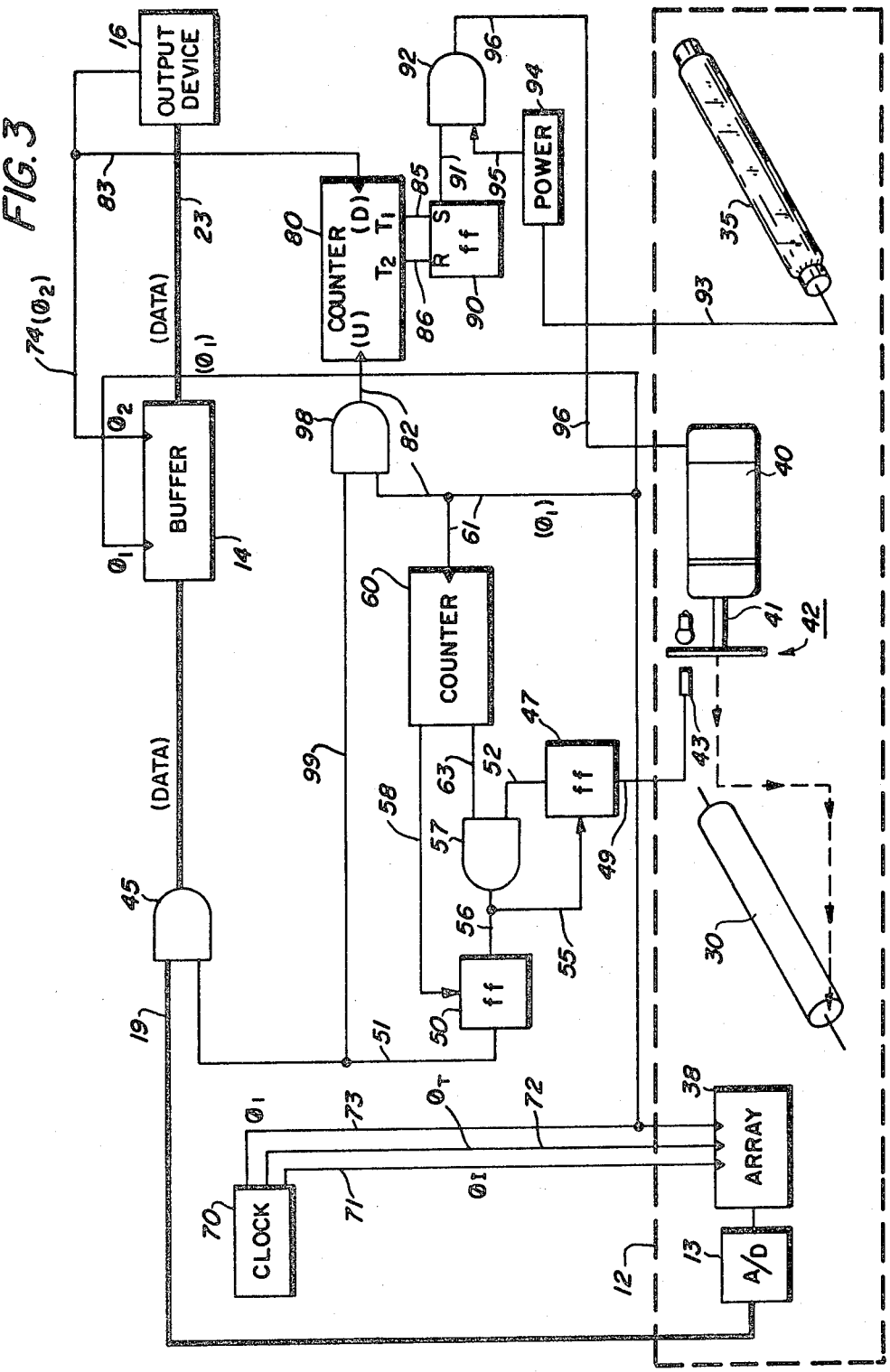
FIG. 3 is a circuit diagram showing details of the control arrangement for the raster scanner of the present invention.

Referring particularly to FIG. 3 of the drawings, signal processing circuitry 13 is provided at the output of array 38 to convert the analog signal output of array 38 to digital. Additionally, circuitry 13 preferably includes a gain circuit for raising the signal output level of array 38.

Pixel control gate 45 in date bus 19 couples scanning module 12 with buffer 14. As will appear, gate 45 controls the output of pixels to buffer 14, gate 45 serving when actuated to pass pixels output by array 38 to buffer 14. When not actuated, pixel control gate 45 blocks the output of pixels to buffer 14.

Controller 15 includes a flip flop 47, the set gate of flip flop 47 being coupled by line 49 with detector 43 of encoder 42. The output of flip flop 47 is coupled by line 52 to one input of a control gate 57.

A control counter 60 is provided. Counter 60 is driven by pixel clock timing pulses $\phi_1$ input thereto through clock lead 61. One output of counter 60, representing the start-up of a pixel line, is coupled to a second input terminal of gate 57 through line 63. As will appear, counter 60 inhibits actuation of control gate 57 while image pixels are being output by array 38 to prevent feeding of partial lines to buffer 14.

The output of control gate 57 is coupled through line 56 to the set gate of control flip flop 50. Line 55 couples the output of gate 57 with the reset gate of flip flop 47. The output of control flip flop 50 is coupled by line 51 to a second input of pixel control gate 45. Line 58 couples a second output of counter 60 to the reset gate of control flip flop 50.

A suitable clock 70 is provided for generating array integrating, transfer, and pixel clock timing pulses $\phi_I$, $\phi_T$, $\phi_1$ respectively. Timing pulses $\phi_I$, $\phi_T$, $\phi_1$ are input to array 38 through clock leads 71, 72, 73. Image pixels in buffer 14 are clocked therefrom at the clock frequency of the output device, represented here by pixel clock output signals $\phi_2$. Pixel clock output signals $\phi_2$ are input to buffer 14 through clock lead 74 from the output device 16.

To match the output of scanning module 12 with the needs of buffer 14, a suitable up/down counter 80 is provided. Clock signals $\phi_1$, $\phi_2$ are input to the up (U)/down(D) inputs of counter 80 through clock leads 82, 83. Output lines 85, 86 couple the output terminals T1, T2 of counter 80 to the set/reset gates of the data control flip flop 90. Output terminal T1 of counter 80 represents a predetermined minimum count on counter 80 which in turn, is representative of a predetermined minimum supply of image pixels in buffer 14. Output terminal T2 of counter 80 represents a predetermined maximum count on counter 80 corresponding to a predetermined maximum number of image pixels in buffer 14.

The Q output of flip flop 90 is input through line 91 to one input of power control gate 92. A second input of gate 92 is coupled to a suitable source of energizing power, represented by the numeral 94, through line 95. Power line 96 couples the output of power control gate 92 to the energizing windings of transport motor 40. Lamp 35 is coupled to power source 94 by line 93.

A clock lead 61 is coupled to one input of counter gate 98. Clock lead 82 couples the output of gate 98 to counter 80. Line 99 couples the enable input of gate 98 to the output of control flip flop 50 via line 51.

In operation, power supply 94 is actuated to energize lamp 35. Clock 70 is also actuated to provide clock signals $\phi_I$, $\phi_T$, $\phi_1$ to the array 38. The document 18 to be scanned is advanced forward into the nip of the first pinch roll pair 30 of document transport 29. Presuming buffer 14 to be empty, the signal from counter 80 sets flip flop 90 to apply an enabling signal to power control gate 92. With gate 92 enabled, transport motor 40, is energized to drive pinch roll pairs 30, 31 of document transport 29. Roll pairs 30, 31 transport the document 18 across platen 25 and scan slit 26. As the document moves across slit 26, array 38 scans the exposed portion of the document line by line.

It will be understood that during the interval defined by the integration clock pulse $\phi_1$, integration of the document area viewed by array 38 takes place, during which the image pixels are collected by the array photosensitive elements. On transfer clock pulse $\phi_T$, the image pixels are transferred to the array shift register(s) and thereafter serially clocked out to data bus 19 and pixel control gate 45 by clock pulses $\phi_1$. Where gate 45 is triggered, the pixel line is output to buffer 14 where the pixels are temporarily stored pending a request by output device 16. During clocking out of pixels from the array on-board shift register(s), integration of the next scan line is taking place.

With rotation of transport motor shaft 41, encoder 42 commences to generate pulses, the frequency of the encoder pulses increasing as document transport 29 comes up to full operating speed. Each signal pulse output by detector 43 of encoder 42 sets flip flop 47 to enable control gate 57. With gate 57 enabled, the signal output of counter 60 to line 63 at the start of the next line triggers the enabled gate 57. The signal output of gate 57 sets control flip flop 50 to output an enabling signal to pixel control gate 45. As a result, the line of image pixels output by array 38 to bus 19 is passed by gate 45 to output buffer 14 at the pixel clock rate $\phi_1$.

On triggering, the signal output of control gate 57 resets flip flop 47 through line 55. On reaching a predetermined maximum count equal to the number of pixels in the line, the reset signal output of counter 60 to line 58 resets flip flop 50. Resetting of flip flop 50 disables pixel control gate 45 to block the further transmittal of pixels from array 38 to buffer 14.

The above described procedure is repeated for subsequent lines of image pixels, the pixel lines being stored in buffer 14.

At startup, as document transport 29 accelerates from rest to full operating speed, the frequency of the pulses generated by encoder 42 progressively increases until full scanning speed is attained. Although the rate at which lines of image pixels are generated by array 38 during startup and acceleration of document transport 29 is greater than the frequency of the pulses output by encoder 42, only those lines associated with pulses from encoder 42 are passed to buffer 14. Output of the remaining lines is blocked by pixel control gate 45. Output of partial lines of image pixels of buffer 14 is precluded by control counter 60 which inhibits actuation of control gate 57 until output of the next line of image pixels by array 38.

With input of image pixels to buffer 14, the number of lines of image pixels stored in buffer 14 rises. As each line of image pixels in input to buffer 14, counter gate 98 is enabled by the signal output of control flip flop 50; and the pixel clock pluses $\phi_1$, which clock the line of image pixels from array 38 to buffer 14, are applied to counter 80 to increment counter 80. When the count on counter 80 reaches a preset maximum, the signal output of counter 80 to line 86 and flip flop 90 resets flip flop 90 to remove the enabling signal to power control gate 92. With gate 92 disabled, power to drive motor 40 is terminatd, bringing document transport to a stop, it being understood that inertia of the system precludes instantaneous stopping of transport 39.

As movement of document transport 29 slows, the frequency of the pulses output by encoder 42 correspondingly decrease and cease when transport 29 comes to a full stop. As the frequency of the signal pulses output by encoder 42 decreases, pixel control gate 45 is increasingly disabled to clock output of pixels to buffer 14. On document transport 29 coming to a complete stop, gate 45 is permanently disabled. Accordingly, output of image pixels to buffer 14 is blocked, it being understood that array 38 remains operative.

On a call or request for image pixels by the output device 16, clock timing signal $\phi_2$ therefrom clocks the image pixels from buffer 14 through bus 23 to the output device 16. At the same time, the clock timing signals $\phi_2$ decrement counter 80. As the number of lines of image pixels in buffer 14 decrease, the count on counter 80 decrements, and at a preset low count, representing a predetermined minimum supply of pixels in buffer 14, an enabling signal in line 85 sets flip flop 90. The signal from flip flop 90 triggers power control gate 92 to energize transport motor 40. As described, energization of motor 40 starts pinch roll pairs 30, 31 of document transport 29 which in turn, advances the document 18 across scan slit 26. With energization of motor 40, encoder 42 commences to generate pulses which in turn, actuate control flip flop 50 to enable pixel control gate 45 and output pixels to buffer 14 in the manner described heretofore.

In relatively low speed applications, a stepping motor may be used in place of servo motor 40 to operate the document transport 29. In that application, document advance would be on a step by step basis with one step associated with each scanned line. The operational sequence would therefore comprise stepping the document one line, scanning the line, stepping the document to the next line, scanning the line, and so forth and so on. As described heretofore, scanning includes integration, transfer, and shiftout of the image pixels obtained to the storage buffer.

In this type of application, buffer 14 may comprise a very small buffer, i.e. a two line buffer. The scanning module, as in the principal embodiment described, is operated to maintain pixel lines in the buffer. On withdrawal of a scan line from the buffer by the output device or user, the document is stepped one line and the line scanned to replenish the line drawn from the buffer.

Where a relatively continuous demand for pixel lines exists the document is stepped and read continuously. Where the demand is intermittent, stepping and scanning of the document is on demand.

While buffer 14 has been illustrated and described as being a component part of scanner 10, it will be understood that buffer 14 may comprise part of the output device 16 with which scanner 10 is associated.

While the invention has been described with reference to the structure disclosed, it is not confined to the details set forth, but is intended to cover such modifications or changes as may come within the scope of the following claims.

I claim:
1. In a raster scanner, the combination of:
   (a) a platen for supporting documents to be scanned;
   (b) a document scanning slit in said platen;
   (c) document transport means for transporting documents to be scanned along said platen and across said scanning slit at a controlled scanning speed;
   (d) at least one array of scanning elements for scanning documents line by line through said scanning slit, said array producing image pixel lines representative of the document image scanned;
   (e) clock means for operating said array at a preset scanning rate;
   (f) buffer means for receiving pixel lines output by said array;
   (g) means for starting and stopping said document transport means in response to demand for pixel lines by said buffer means; and
   (h) control means for discarding redundant pixel lines output by said array when said document transport means is stopped or accelerating or decelerating to or from said controlled scanning speed to thereby accommodate continued operation of said array at said preset scanning rate while said document transport means is stopped, or accelerating or decelerating while avoiding output of redundant pixel lines to said buffer means.

2. The scanner according to claim 1 in which said control means includes gate means for selectively blocking output of pixel lines by said array to said buffer means, and
   means for actuating said gate means to a blocking condition in response to stopping of said document transport means.

3. The scanner according to claim 1 in which said control means includes:
   means fo generating a signal identifying valid pixel lines, and
   selector means for passing pixel lines output by said array to said buffer means in response to said signal.

4. The scanner according to claim 1 in which said control means includes:
   (a) a control gate interposed between said array and said buffer means to control output of pixel lines from said array to said buffer means, said control gate in a first state blocking passage of pixel lines to said buffer means and in a second state permitting passage of pixel lines to said buffer means;
   (b) means for generating a control signal in synchronism with movement of said document transport means; and
   (c) a control for switching said control gate to said second state in response to said control signal whereby to pass pixel lines output by said array to said buffer means.

5. The scanner according to claim 4 including a second control for intervening to delay switching of said control gate to said second state until start of a pixel line whereby to prevent input of a partial pixel line to said buffer means.

6. In a raster scanner, the combination of:
   (a) a platen, said platen having a document scanning aperture therein;
   (b) transport means for moving documents to be scanned in step by step fashion across said scanning aperture;
   (c) at least one scanning array for scanning documents on said platen as said documents are moved across said scanning aperture by said transport means, said array generating a pixel line on each scan;
   (d) clock means for operating said array at a preset scan rate;
   (e) buffer means for receiving pixel lines output by said array;
   (f) means for actuating said transport means on a demand for pixel lines by said buffer means to step the document being scanned at least one step; and
   (g) control means for outputting one pixel line to said buffer means for each document step and discarding any duplicate pixel lines resulting from repeated scanning of the same document line by said array when the rate at which the document is stepped is less than the scan rate of said array.

7. A scanning method for supplying pixel lines on demand to a buffer while accommodating any disparity between the scan rate of a scanning array which scans documents one line at a time through a scan slit and the rate at which documents are moved across said scan slit, the steps which comprise:
   (a) scanning said array continuously to produce pixel lines at a predetermined rate irrespective of document movement;
   (b) monitoring the supply of pixel lines in said buffer;
   (c) moving the document to be scanned across said scan slit in response to a preset low supply of pixel lines in said buffer and stopping said document when the supply of pixel lines in said buffer reaches a preset high; and
   (d) outputting one pixel line to said buffer for each document line scanned and discarding any redundant pixel lines resulting from repeated scanning of the same document line by said array when the rate at which documents are moved across said scan slit is less than said array scan rate.

8. The scanning method according to claim 7 including the step of preventing output of partial pixel lines to said buffer.

9. A scanning method for supplying pixel lines on demand to a buffer while accommodating any disparity between the scan rate of a scanning array which scans documents one line at a time through a scan slit and the rate at which documents are moved across said scan slit, the steps which comprise:

(a) scanning said array continuously to produce pixel lines at a predetermined rate irrespective of document movement;

(b) monitoring the supply of pixel lines in said buffer;

(c) stepping the document to be scanned across said scan slit one line at a time in response to a preset low supply of pixel lines in said buffer and terminating said stepping when the supply of pixel lines in said buffer reaches a preset high; and (d) outputting one pixel line to said buffer for each document step and discarding any redundant pixel lines resulting from repeated scanning of the same document line by said array when the rate at which the document being scanned is stepped across said scan slit is less than said array scan rate.

* * * * *